United States Patent
Doddaiah et al.

(10) Patent No.: US 12,524,359 B2
(45) Date of Patent: Jan. 13, 2026

(54) TIME SERIES BASED MDP PAGING FOR SNAPSHOT, REPLICATION AND MIGRATION

(71) Applicant: Dell Products L.P., Hopkinton, MA (US)

(72) Inventors: Ramesh Doddaiah, Westborough, MA (US); Sandeep Chandrashekhara, Shrewsbury, MA (US); Mohammed Asher, Bangalore (IN)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/663,137

(22) Filed: May 14, 2024

(65) Prior Publication Data

US 2025/0355819 A1  Nov. 20, 2025

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
None
See application file for complete search history.

(56) References Cited

U.S. PATENT DOCUMENTS

| | | | | |
|---|---|---|---|---|
| 9,519,647 | B2* | 12/2016 | Batwara | G06F 16/185 |
| 10,102,147 | B1* | 10/2018 | BenHanokh | G06F 12/123 |
| 10,719,257 | B1* | 7/2020 | Meiri | G06F 3/0674 |
| 10,747,684 | B2* | 8/2020 | Woo | G06F 12/0866 |
| 11,354,271 | B2* | 6/2022 | Yeager | G06F 16/1734 |
| 11,467,970 | B1* | 10/2022 | Tomlin | G06F 3/0679 |
| 11,615,028 | B2* | 3/2023 | Derzhavetz | G06F 12/123 711/154 |

* cited by examiner

*Primary Examiner* — Elias Mamo
(74) *Attorney, Agent, or Firm* — Anderson Gorecki LLP

(57) ABSTRACT

Metadata pages used exclusively for maintenance IOs associated with snapshots, data migration, or data replication are paged-out according to a time series model forecasted TTL. Metadata pages used for production IOs are paged-out using an LRU algorithm. The forecasted TTL corresponds to the expected time during which the metadata pages will be needed to service the maintenance IOs.

20 Claims, 4 Drawing Sheets

TIME SERIES BASED MDP PAGING FOR SNAPSHOT, REPLICATION AND MIGRATION

TECHNICAL FIELD

The subject matter of this disclosure is generally related to electronic data storage.

BACKGROUND

Data storage systems such as storage arrays, Storage Area Networks (SANs), Network-Attached Storage (NAS), and software-defined variants thereof are used to support multi-client host applications that run on server clusters. Examples of the host applications may include software for email, accounting, inventory control, sales, and engineering. In order to maintain data availability and avoid data loss, the storage systems implement features such as data migration, remote replication, and periodic snapshot generation. Such system maintenance features compete with the host applications for storage system resources.

SUMMARY

A method in accordance with some implementations comprises

An apparatus in accordance with some implementations comprises:

In accordance with some implementations, a computer-readable storage medium stores instructions that when executed by a computer cause the computer to perform a method This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines, including, but not limited to, compute nodes, computers, computing nodes, and servers, and processes are therefore enabled and within the scope of the disclosure.

Figure 1:
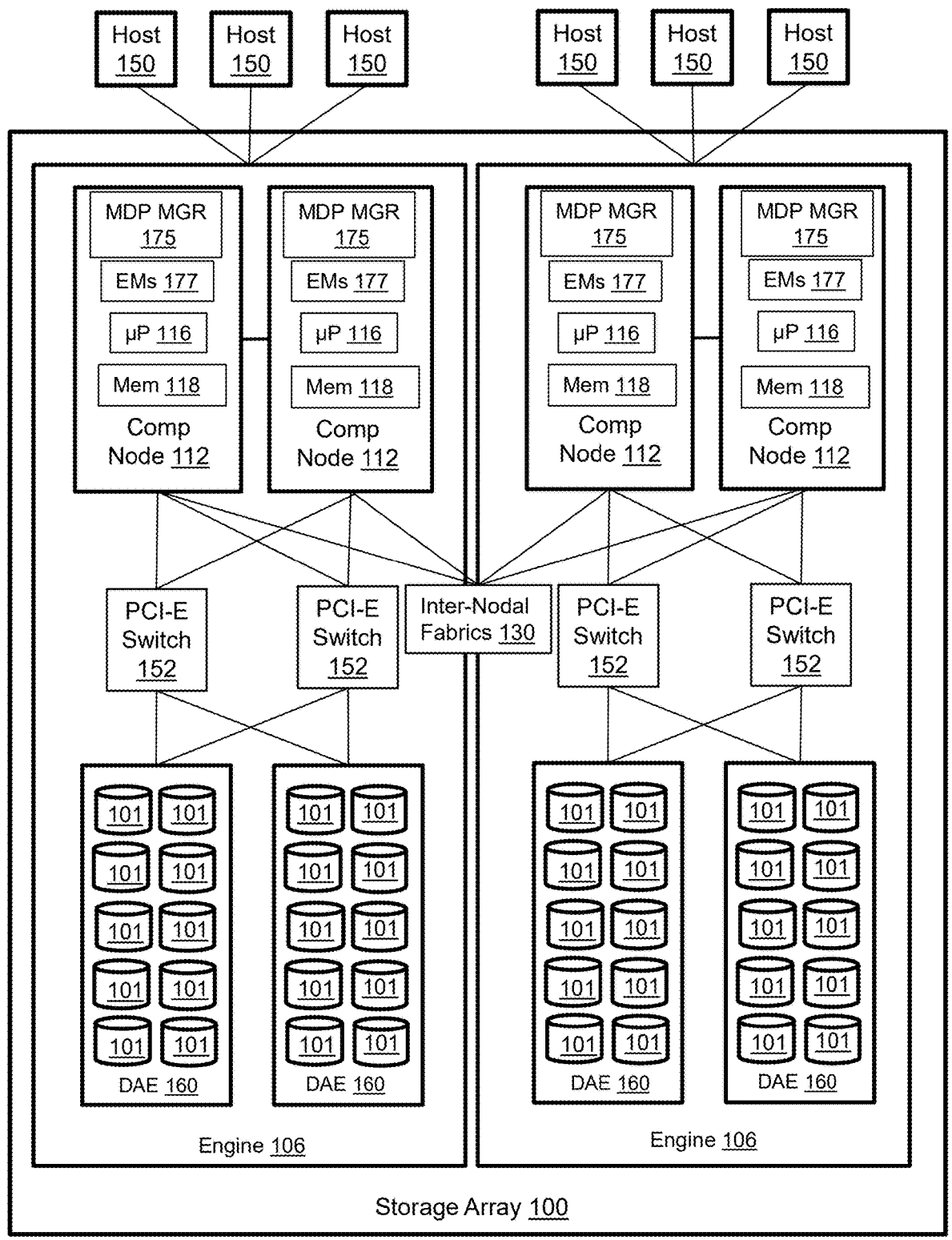
FIG. 1 illustrates a storage array that uses time series modeling to page-out metadata that is used exclusively for maintenance IOs and uses an LRU algorithm to page-out metadata that is used for production IOs.

FIG. 1 illustrates a storage array 100 that uses time series modeling to page-out metadata that is used exclusively for maintenance IOs and uses an LRU algorithm to page-out metadata that is used for production IOs. The term "metadata" as used in the present disclosure refers to mappings between data locations in logical storage objects, memory, and physical disk drives. A metadata page (MDP) may include mappings for a sequence of addresses. The term "production IOs" refers to IOs that directly support host application functions. Examples of production IOs may include, but are not limited to, read and write commands from host application instances. The term "maintenance IOs" refers to IOs that are not generated by host applications but may indirectly support the host applications, such as by maintaining data availability and avoiding data loss. Examples of maintenance IOs may include, but are not limited to, IOs associated with snapshot generation, data migration, and remote replication of storage objects.

The illustrated storage array 100 includes two engines 106. Each engine 106 includes two disk array enclosures (DAEs) 160 and a pair of peripheral component interconnect express (PCI-e) interconnected compute nodes 112 that are also referred to as "storage directors." Within each engine, the compute nodes and DAEs are interconnected via redundant PCI-e switches 152. Each DAE 160 includes managed drives 101 that are non-volatile storage media that may be of any type, e.g., solid-state drives (SSDs) based on nonvolatile memory express (NVMe) and EEPROM technology such as NAND and NOR flash memory. Each compute node 112 is implemented as a separate printed circuit board and includes resources such as at least one multi-core processor 116 and local memory 118. Processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host servers 150 for servicing IOs from the host servers. Each compute node also includes one or more adapters for communicating with other compute nodes via redundant inter-nodal channel-based InfiniBand fabrics 130.

Emulations (EMs 177) perform different storage-related tasks and functions. Front-end emulations handle communications with the host servers 150. For example, front-end emulations receive production IO commands from host servers and return data and write acknowledgements to the host servers. Back-end emulations handle communications with managed drives 101 in the DAEs 160, 162. Data services emulations process IOs. Remote data services emulations handle maintenance IOs with other storage systems, e.g., other storage arrays for remote replication, remote snapshot creation, and data migration. Metadata paging managers 175 may include one or more of: special purpose electronic components, logic, and computer program code loaded into memory 118 from the managed drives 101 and run on the processors 116.

Figure 2:
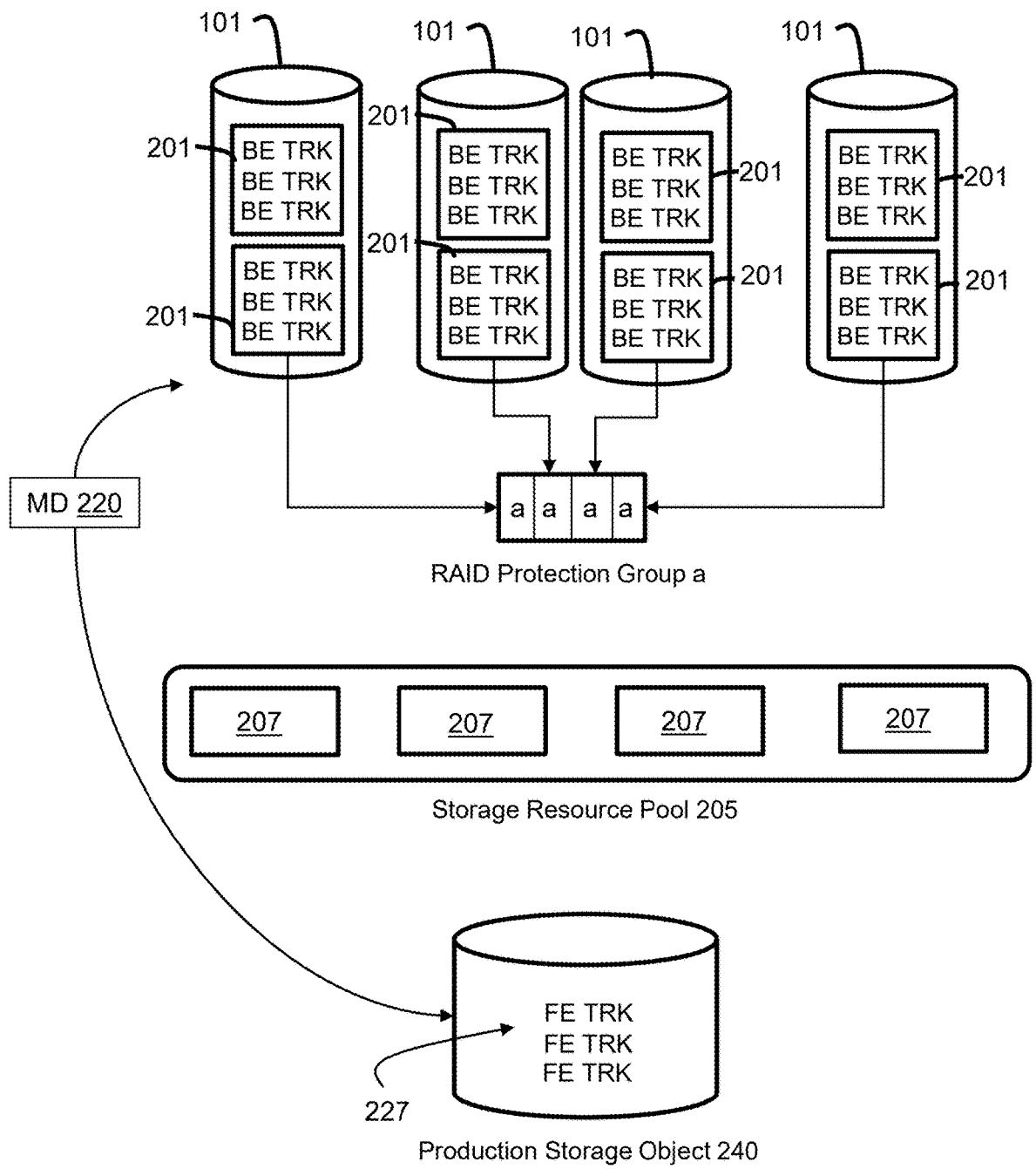
FIG. 2 illustrates layers of abstraction between a production storage object and the managed drives of the storage array of FIG. 1.

Referring to FIGS. 1 and 2, data that is created and used by instances of the host applications running on the host servers 150 is maintained on the managed drives 101. The managed drives are not discoverable by the host servers 150, so the storage array 100 creates logical storage devices such as production storage object 240 that can be discovered and accessed by the host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers 150, each production storage object is a single disk drive having a set of contiguous fixed-size logical block addresses (LBAs) on which data used by the instances of one of the host applications resides. However, the host application data is stored at non-contiguous addresses on each of multiple ones of the managed drives 101. IO services emulations running on the processors of the compute nodes maintain metadata 220 that maps between the LBAs of the production storage object 240 and physical addresses on the managed drives 101 in order to process IOs. Each production storage object is uniquely associated with a single host application, of which there may be multiple instances running on the host servers. The storage array may maintain a plurality of production storage objects and simultaneously support multiple host applications.

The basic allocation unit of storage capacity that is used by the compute nodes 112 to access the managed drives 101 is a back-end track (BE TRK). The managed drives are organized into same-size units of storage capacity referred to herein as cells 201, each of which may contain multiple BE TRKs. A grouping of cells from different managed drives is used to create a RAID protection group, e.g., RAID protection group "a." Storage resource pool 205 is a type of storage object that includes a collection of protection groups of the same RAID level. The host application data is logically stored in front-end tracks (FE TRKs) on production storage object 240. The FE TRKs of the production storage object 240 are mapped to the BE TRKs on the managed drives 101 and vice versa by tables and pointers in the metadata 220, pages of which are paged-in to the shared memory as needed. Although it is known to design storage arrays that maintain all metadata in shared memory, it can be more cost-effective to page-in metadata on an as-needed basis so that a smaller amount of memory is needed.

Figure 3:
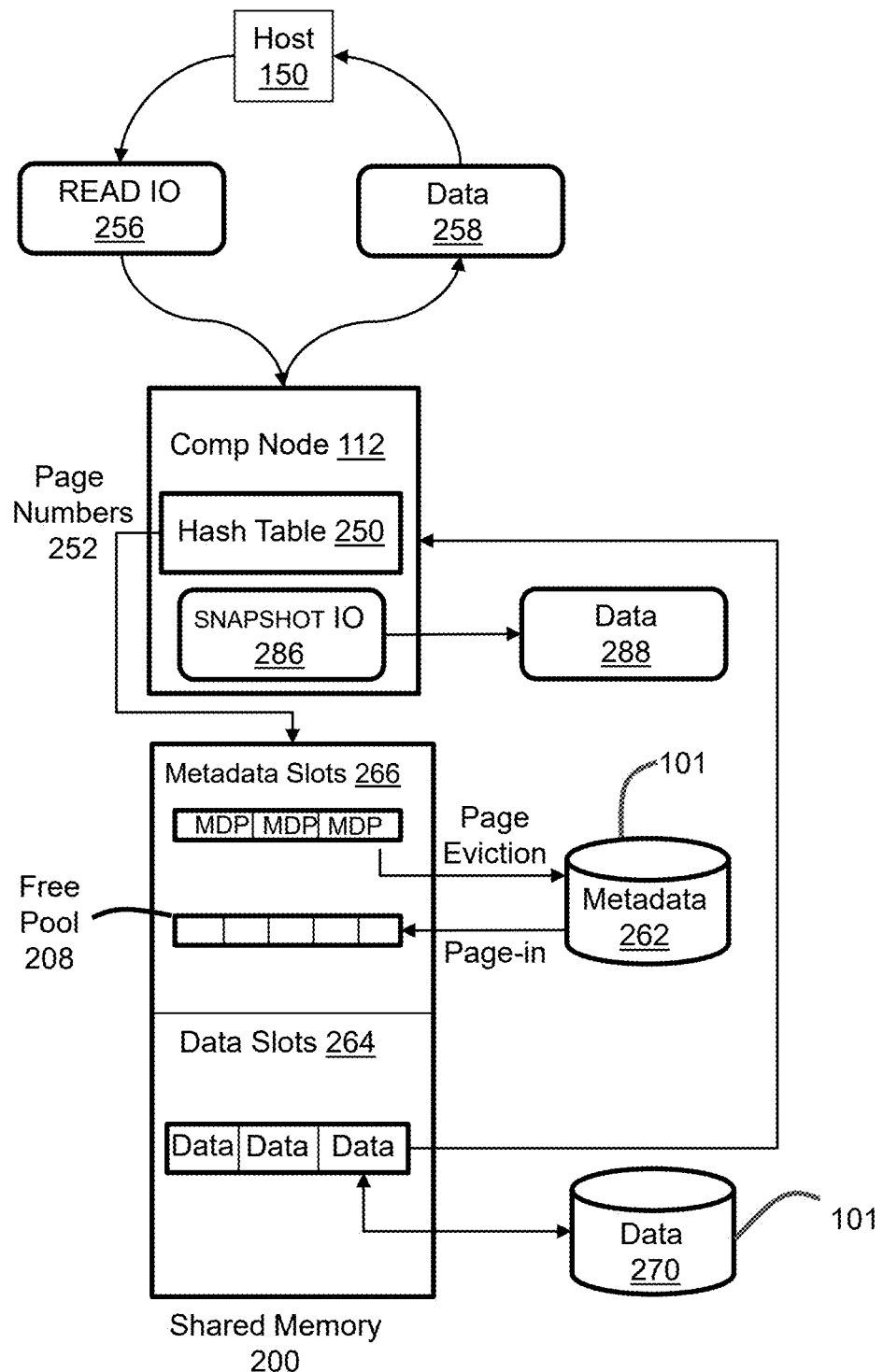
FIG. 3 illustrates metadata paging.

FIG. 3 illustrates metadata paging. Each compute node dedicates a portion or partition of its respective local memory to a logical shared memory 200 that can be accessed by other compute nodes, e.g. via direct memory access (DMA) or remote DMA (RDMA). Metadata 262 for all storage objects in the form of MDPs is maintained on the managed drives 101. A metadata slots 266 portion of the shared memory 200 is dedicated for temporarily holding selected MDPs that are paged-in from metadata 262. The MDPs, which may all have a single fixed size, include track identifications (TIDs) that indicate, among other things, where associated tracks of data are located in a data slots 264 portion of the shared memory 200 and managed drives 101. A free pool 208 of empty metadata slots that do not contain MDPs facilitates efficient page-in of MDPs from the managed drives by providing already-available free space in the shared memory when MDPs need to be paged-in to service incoming IOs. MDPs are evicted from the metadata slots by the MDP managers in page-out operations that will be described below. An MDP that has been updated is paged-out by moving it to the managed drives 101, thereby increasing the size of the free pool 208. All data 270 stored on production storage objects is maintained in BE TRKs on the managed drives 101. The data slots 264 portion of the shared memory 200 is dedicated for temporarily holding selected tracks of the data for servicing IOs, where tracks are allocation units that may all have the same fixed size. For example, tracks that are required to process IOs are copied into the data slots and tracks that are no longer required are destaged to the managed drives or flushed from the shared memory if the data is not dirty.

In response to receipt of a production IO 256 sent by a host server 150 on behalf of a host application to read data 258 from a production storage object, a compute node 112 uses information in the IO as input to a hash table 250 to obtain page numbers 252 of the MDPs associated with the data addresses indicted in the IO. The page numbers are used to find the corresponding MDPs in the metadata slots 266 of the shared memory 200. The TIDs in those MDPs are used to find and obtain the corresponding data 258 in the data slots 264 or managed drives 101. A maintenance IO 286 such as a snapshot IO to access data 288 is similarly processed.

The MDPs indicated by the page numbers are not necessarily located in the metadata slots when IO 286 is generated or when IO 256 is received. If the MDPs are not present in the metadata slots 266 when the IO is generated or received, which may be referred to as a "cache miss," then the MDPs indicated by the page numbers 252 are paged-in from metadata 262 on managed drives 101, e.g. copied into metadata slots in the free pool 208. If there are not enough empty slots in the free pool, then some of the MDPs already in the metadata slots are evicted. Such eviction for the purpose of freeing space for page-in related to a pending IO is referred to as foreground eviction. Cache misses increase access latency because of the added steps of accessing MDPs from the managed drives and evicting MDPs from the metadata slots.

The competition between production IOs and maintenance IOs for resources such as metadata slots can increase production IO cache misses and latency, which is potentially problematic because production IOs are generally considered to be higher priority than maintenance IOs. Previously, it was common to use a least recently used (LRU) eviction algorithm to select MDPs for eviction without regard for whether the pages were associated with production IOs or maintenance IOs. A LRU algorithm selects MDPs for eviction based on elapsed time since most recent use. At any given time, the MDP with the greatest elapsed time since the most recent access is the target for eviction if slots need to be freed. Maintenance IOs tend to be generated in bursts, so corresponding MDPs may be paged-in in bursts, thereby rapidly increasing evictions of MDPs for production IOs, reducing the percentage of metadata slots with MDPs for production IOs, and increasing production IO cache misses. The problem may be exacerbated by the different access characteristics of MDPs for maintenance IOs relative to MDPs for production IOs. MDPs for maintenance IOs tend to be accessed in bursts, e.g., while sequential data is being replicated, snapped, or migrated, and afterwards are not accessed again. In contrast, access to MDPs for production IOs may be at random intervals without a predictable end. As such, an LRU algorithm tends to retain unneeded maintenance IO MDPs that crowd out needed production IO MDPs.

Figure 4:
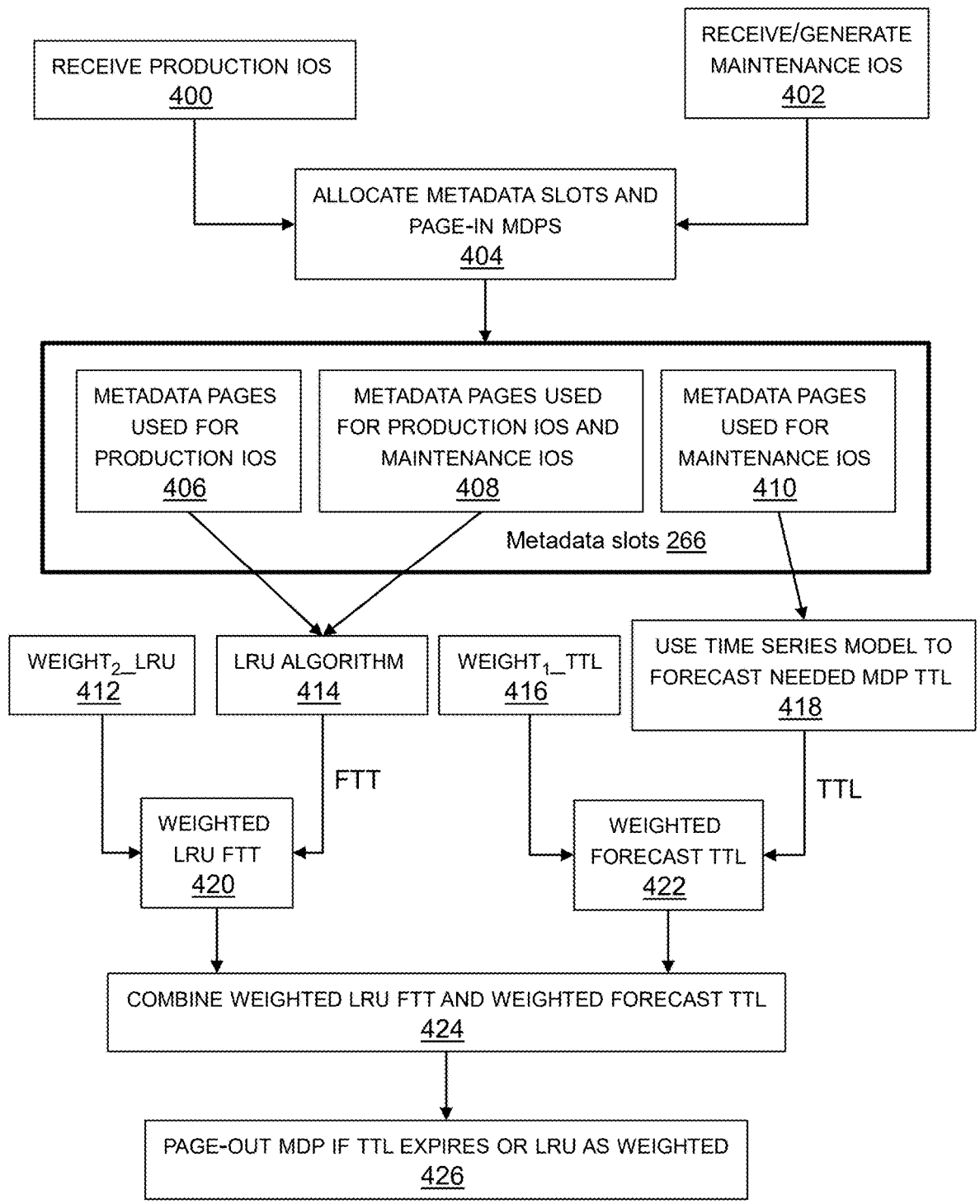
FIG. 4 illustrates a method for using weighted time series forecasting and weighted LRU FTT to determine when to evict pages of metadata from shared memory.

FIG. 4 illustrates a method for using weighted time series forecasting and weighted LRU fall-through time (FTT) to determine when to evict pages of metadata from shared memory. The method may be implemented by the metadata paging managers. Production IOs are received in step 400 and maintenance IOs are generated and received in step 402. In response, metadata slots are allocated and corresponding MDPs are paged-in as indicated in step 404. As a result, the metadata slots 266 contains MDPs 406 used exclusively for production IOs and MDPs 410 used exclusively for maintenance IOs. Some MDPs 408 may be used for both production IOs and maintenance IOs. The MDPs 406 used exclusively for production IOs and the MDPs 408 used for both production IOs and maintenance IOs are processed by a LRU algorithm in step 414 to determine FTT. A weight, $WEIGHT_2\_LRU$ 412, is applied in step 420 to calculate a weighted LRU FTT for each MDP of pages 406, 408, e.g., $FTT*WEIGHT_2\_LRU$. The MDPs 410 used exclusively for maintenance IOs are processed by a time series model to forecast needed time-to-live (TTL) in step 418, e.g., without regard to whether the MDPs are the least recently accessed MDP. As previously mentioned, MDPs for maintenance IOs tend to be accessed repeatedly over a relatively short period of time, e.g., while the sequential data is being replicated, snapped, or migrated, and afterwards are not accessed again. The model forecasts a TTL corresponding to the short period of time before the MDP will not be accessed again, e.g., a TTL equal to the period of time that a snapshot MDP is expected to fill. A weight, $WEIGHT_1\_TTL$ 416, is applied in step 422 to determine a weighted forecast TTL for each MDP of pages 410, e.g., $TTL\_Forecasted*WEIGHT_1\_TTL$. The weighted LRU FTT and weighted forecast TTL are combined in step 424, e.g., $(FTT*WEIGHT_2\_LRU)+(TTL\_Forecasted*WEIGHT_1\_TTL)$ to compute a final TTL. As indicated in step 426, an MDP is paged-out if its TTL expires or it is the least recently used MDP as weighted. In some implementations $WEIGHT_1\_TTL=0$ and $WEIGHT_2\_LRU=1$ for MDPs 410 used exclusively for maintenance IOs. In some implementations $WEIGHT_1\_TTL=1$ and $WEIGHT_2\_LRU=0$ for MDPs 408, 410 used for production IOs.

The technique described above can advantageously be used to page-out MDPs used exclusively for maintenance IOs when those MDPs are no longer needed, rather than waiting for those MDPs to become the least recently used MDPs. The forecast TTL resulting from the time series model tends to evict MDPs used exclusively for maintenance IOs sooner than the LRU algorithm would, but not so soon that the MDPs need to be paged-in again.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method implemented by a storage array having compute nodes with volatile memory, the compute nodes managing access to non-volatile disk storage with paged metadata, the method comprising:
    identifying an input-output operation (IO) between the non-volatile disk storage and the volatile memory of one of the compute nodes as being a maintenance IO for snapshot generation, data migration, or remote replication of storage objects;
    paging-in a first metadata page corresponding to the maintenance IO from the non-volatile disk storage to the volatile memory of one of the compute nodes; and
    paging-out the first metadata page after a forecasted time-to-live (TTL) has expired and before the first metadata page becomes a least recently used metadata page,
    whereby metadata pages used exclusively for maintenance IOs are evicted after less time in the volatile memory than metadata pages not used exclusively for maintenance IOs.

2. The method of claim 1 further comprising using a time series model to forecast the TTL.

3. The method of claim 2 further comprising identifying an IO as being a production IO, paging-in a second metadata page corresponding to the production IO from non-volatile disk storage to memory, and paging-out the second metadata page based on selection by a least recently used (LRU) algorithm.

4. The method of claim 3 further comprising identifying a third page of metadata as being used for both production IOs and maintenance IOs and paging-out the third metadata page based on selection by the LRU algorithm.

5. The method of claim 4 further comprising applying a weight to the forecasted TTL.

6. The method of claim 5 further comprising applying a weight to a fall-through time (FTT) determined by the LRU algorithm.

7. The method of claim 6 further comprising combining the weighted forecasted TTL and the weighted LRU FTT.

8. An apparatus, comprising:
    a plurality of disk drives; and
    at least one compute node configured to manage access to the disk drives, the compute node comprising a processor, memory, and a metadata paging manager configured to:
        identify an input-output operation (IO) between the disk drives and the memory of one of the compute nodes as being a maintenance IO for snapshot generation, data migration, or remote replication of storage objects;

page-in a first metadata page corresponding to the maintenance IO from the disk drives to the memory of one of the compute nodes; and page-out the first metadata page after a forecasted time-to-live (TTL) has expired and before the first metadata page becomes a least recently used metadata page, whereby metadata pages used exclusively for maintenance IOs are evicted after less time in the volatile memory than metadata pages not used exclusively for maintenance IOs.

9. The apparatus of claim 8 further comprising the metadata paging manager configured to use a time series model to forecast the TTL.

10. The apparatus of claim 9 further comprising the metadata paging manager configured to identify an IO as being a production IO, page-in a second metadata page corresponding to the production IO from non-volatile disk storage to memory, and page-out the second metadata page based on selection by a least recently used (LRU) algorithm.

11. The apparatus of claim 10 further comprising the metadata paging manager configured to identify a third page of metadata as being used for both production IOs and maintenance IOs and page-out the third metadata page based on selection by the LRU algorithm.

12. The apparatus of claim 11 further comprising the metadata paging manager configured to apply a weight to the forecasted TTL.

13. The apparatus of claim 12 further comprising the metadata paging manager configured to apply a weight to a fall-through time (FTT) determined by the LRU algorithm.

14. The apparatus of claim 13 further comprising the metadata paging manager configured to combine the weighted forecasted TTL and the weighted LRU FTT.

15. A non-transitory computer-readable storage medium storing instructions that when executed by a computer cause the computer to perform a method implemented by a storage array having compute nodes with volatile memory, the compute nodes managing access to non-volatile disk storage with paged metadata, the method comprising:

identifying an input-output operation (IO) between the non-volatile disk storage and the volatile memory of one of the compute nodes as being a maintenance IO for snapshot generation, data migration, or remote replication of storage objects;

paging-in a first metadata page corresponding to the maintenance IO from the non-volatile disk storage to the volatile memory of one of the compute nodes; and paging-out the first metadata page after a forecasted time-to-live (TTL) has expired and before the first metadata page becomes a least recently used metadata page, whereby metadata pages used exclusively for maintenance IOs are evicted after less time in the volatile memory than metadata pages not used exclusively for maintenance IOs.

16. The non-transitory computer-readable storage medium of claim 15 in which the method further comprises using a time series model to forecast the TTL.

17. The non-transitory computer-readable storage medium of claim 16 in which the method further comprises identifying an IO as being a production IO, paging-in a second metadata page corresponding to the production IO from non-volatile disk storage to memory, and paging-out the second metadata page based on selection by a least recently used (LRU) algorithm.

18. The non-transitory computer-readable storage medium of claim 17 in which the method further comprises identifying a third page of metadata as being used for both production IOs and maintenance IOs and paging-out the third metadata page based on selection by the LRU algorithm.

19. The non-transitory computer-readable storage medium of claim 18 in which the method further comprises applying a weight to the forecasted TTL and applying a weight to a fall-through time (FTT) determined by the LRU algorithm.

20. The non-transitory computer-readable storage medium of claim 19 in which the method further comprises combining the weighted forecasted TTL and the weighted LRU FTT.

* * * * *